(12) United States Patent
Umemori et al.

(10) Patent No.: US 11,535,917 B2
(45) Date of Patent: Dec. 27, 2022

(54) STEEL FOR MOLD, AND MOLD

(71) Applicant: DAIDO STEEL CO., LTD., Nagoya (JP)

(72) Inventors: Naoki Umemori, Nagoya (JP); Shigeki Higuchi, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 93 days.

(21) Appl. No.: 16/952,994

(22) Filed: Nov. 19, 2020

(65) Prior Publication Data
US 2021/0164084 A1    Jun. 3, 2021

(30) Foreign Application Priority Data

Dec. 3, 2019  (JP) .............................. JP2019-218621
Oct. 13, 2020 (JP) .............................. JP2020-172572

(51) Int. Cl.
*C22C 38/60* (2006.01)
*B33Y 70/00* (2020.01)
(Continued)

(52) U.S. Cl.
CPC .............. *C22C 38/60* (2013.01); *B22C 9/061* (2013.01); *B33Y 70/00* (2014.12); *C22C 38/001* (2013.01);
(Continued)

(58) Field of Classification Search
CPC .......... B22C 9/061; B22F 10/20; B22F 10/64; B22F 2003/248; C21D 1/25; C21D 1/673; C21D 2211/004; C22C 33/0257; C22C 38/001; C22C 38/002; C22C 38/02; C22C 38/06; C22C 38/20; C22C 38/22; C22C 38/24; C22C 38/26; C22C 38/28;
(Continued)

(56) References Cited

U.S. PATENT DOCUMENTS

| 2010/0193089 A1 | 8/2010 | Kataoka et al. |
| 2015/0314366 A1 | 11/2015 | Kawano |

(Continued)

FOREIGN PATENT DOCUMENTS

| CN | 106480370 A | 3/2017 |
| CN | 109773368 A | 5/2019 |

(Continued)

OTHER PUBLICATIONS

Taiwanese Office Action, dated Jul. 16, 2021, in Taiwanese Application No. 109141672 and English Translation thereof.
(Continued)

*Primary Examiner* — Jenny R Wu
(74) *Attorney, Agent, or Firm* — McGinn I.P. Law Group, PLLC.

(57) ABSTRACT

The present invention relates to a steel for mold, containing: 0.28 mass %≤C≤0.65 mass %, 0.01 mass %≤Si≤0.30 mass %, 1.5 mass %≤Mn≤3.0 mass %, 0.5 mass %≤Cr≤1.4 mass %, 1.9 mass %≤Mo+W/2≤4.0 mass %, 0.2 mass %≤V≤1.0 mass %, and 0.01≤N≤0.10 mass %, with the balance being Fe and inevitable impurities, in which, in a state after quenching and tempering, the steel has: a (Mo, W) carbide having a diameter of 0.2 μm or less being in an amount of 1.2 mass % or more, a ratio (mass ratio) of the amount of the (Mo, W) carbide to an amount of a Cr carbide being 11 or more, and a hardness change of 15 HRC or less.

14 Claims, 2 Drawing Sheets

(51) Int. Cl.
- *B22C 9/06* (2006.01)
- *C22C 38/00* (2006.01)
- *C22C 38/02* (2006.01)
- *C22C 38/06* (2006.01)
- *C22C 38/20* (2006.01)
- *C22C 38/22* (2006.01)
- *C22C 38/24* (2006.01)
- *C22C 38/26* (2006.01)
- *C22C 38/28* (2006.01)
- *C22C 38/30* (2006.01)
- *C22C 38/38* (2006.01)

(52) U.S. Cl.
CPC ............ *C22C 38/002* (2013.01); *C22C 38/02* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/38* (2013.01)

(58) Field of Classification Search
CPC ......... C22C 38/30; C22C 38/38; C22C 38/44; C22C 38/46; C22C 38/58; C22C 38/60
See application file for complete search history.

(56) References Cited

U.S. PATENT DOCUMENTS

| | | |
|---|---|---|
| 2017/0058385 A1 | 3/2017 | Umemori et al. |
| 2019/0143460 A1 | 5/2019 | Shimizu et al. |

FOREIGN PATENT DOCUMENTS

| | | |
|---|---|---|
| EP | 3 135 777 A1 | 3/2017 |
| EP | 3 483 295 A1 | 5/2019 |
| JP | H06-256895 A | 9/1994 |
| JP | 2001-073087 A | 3/2001 |
| JP | 2008-095190 A | 4/2008 |
| JP | 2016-166379 A | 9/2016 |
| JP | 2017-061712 A | 3/2017 |
| KR | 2017-0026220 A | 3/2017 |

OTHER PUBLICATIONS

Extended European Search Report dated Apr. 15, 2021 for European Patent Application No. 20211290.0-1103.

Korean Office Action dated Jun. 20, 2022, in corresponding Korean Patent Application No. 10-2020-0166258, with an English translation thereof.

Chinese Office Action dated Jun. 21, 2022, in corresponding Chinese Patent Application No. 202011398722.9, with an English translation thereof.

STEEL FOR MOLD, AND MOLD

TECHNICAL FIELD

The present invention relates to a steel for mold and a mold, and particularly to a steel for mold, exhibiting high softening resistance and a mold using such a steel for mold.

BACKGROUND ART

"Die-casting" refers to a casting method for producing a casting having high dimensional accuracy by injecting a molten metal under high pressure into a mold cavity. Die-casting is used in the production of a casting made of a metal having a relatively low melting point (e.g., Al, Zn, Mg, or an alloy thereof).

"Hot stamping" refers to a molding method in which a plate material heated to a high temperature is press-molded by using a mold, and at the same time as the molding of the plate material, the plate material is rapidly cooled (quenched) with the mold that is cooled with cooling water. Hot stamping is used for press-molding a steel plate having low cold moldability and large springback (e.g., an ultra-high-strength steel plate).

"Tailored die quenching" refers to a molding method in which a plate material heated to a high temperature is press-molded by using a mold whose design surface is partially heated by a heat source, and at the same time as the molding of the plate material, the plate material is partially and rapidly cooled (quenched) with the design surface kept at a low temperature. Tailored die quenching is used for press-molding a part requiring a strength distribution (e.g., a part constituting the skeleton of an automobile).

In methods of processing high temperature work materials, such as the die-casting, the hot stamping, and the tailored die quenching, the mold undergoes a thermal cycle during use. Therefore, this type of mold is required to have high softening resistance and heat check resistance.

Therefore, various proposals have been heretofore made in order to solve this problem.

For example, Patent Literature 1 discloses a high-toughness hot-working tool steel (a) containing, on % by mass basis: C: 0.30% to 0.45%, Si: more than 0.3% to 1.0%, Mn: 0.6% to 1.5%, Ni: 0.6% to 1.8%, Cr: 1.4% to less than 2.0%, Mo+W/2: more than 1.0% to 1.8%, and V+Nb/2: 0.2% or less, with the balance being Fe and inevitable impurities, in which (b) predetermined relational expressions hold between components.

The same literature discloses the following three points: (A) the softening resistance is improved by optimizing the balance between the components; (B) the formation of a coarse carbonitride is prevented and the toughness is improved by reducing the amount of N to 0.015 mass % or less; and (C) the machinability and the softening resistance are improved by optimizing the size of carbides and the number of carbides per unit area.

Patent Literature 2 discloses a hot-working tool steel (a) containing, on % by mass basis: C: 0.34% to 0.40%, Si: 0.3% to 0.5%, Mn: 0.45% to 0.75%, Ni: 0% to less than 0.5%, Cr: 4.9% to 5.5%, Mo and W alone or in combination (Mo+½W): 2.5% to 2.9%, and V: 0.5% to 0.7%, with the balance being Fe and inevitable impurities, in which (b) a cross-sectional structure thereof during quenching includes a mass structure and a needle-like structure, the mass structure (A %) is 45 area % or less, the needle-like structure (B %) is 40 area % or less, and retained austenite (C %) is 5 vol % to 20 vol %.

The same literature discloses the following three points: (A) the structure after quenching has a large influence on toughness and high temperature strength; (B) in order to prevent a decrease in toughness, it is preferable to reduce the mass structure and the needle-like structure each to a predetermined area ratio or less; and (C) less retained austenite is better for preventing deterioration in strength properties, but moderate retention of austenite improves the toughness.

Patent Literature 3 discloses a warm-hot-working nitrided mold (a) containing, on % by weight basis: C: 0.25% to 0.55%, Si: 1.2% or less, Mn: 1.5% or less, Ni: 2.0% or less, Cr: 6.0% to 8.0%, ½W+Mo: 5.0% or less, and Cr/Mo≤3, with the balance being Fe and inevitable impurities, in which (b) an area ratio of an unsolidified carbide with a particle size of 0.1 μm or more in a structure surface is 1% or more, and (c) a nitrided layer is included at least on a surface in contact with a work material, and the hardness at a position 25 μm from the surface of the nitrided layer is 1,100 HV or more.

The same literature discloses the following two points: (A) one of major factors in wear of the nitrided mold is that the surface layer is softened by the heat generated by the friction between the surface of the mold and the high temperature work material, causing plastic flow, and (B) it is possible to synergistically reduce wear accompanied by heat generation by improving the hardness of the surface by a nitriding treatment and increasing the amount of the unsolidified carbide.

Furthermore, Patent Literature 4 discloses an air-quenching cold tool steel containing, containing, by weight ratio: C: 0.60% to 0.85%, Si: 0.50% to 1.50%, Mn: 1.70% to 2.30%, Cr: 0.70% to 2.00%, Mo: 0.85% to 1.50%, and V: 0.10% or less, with the balance being Fe and inevitable impurity elements.

The same literature discloses the following three points: (A) by reducing the amount of C and the amount of Cr as compared with conventional cases, the amount of a carbide is reduced, the particle size of the carbide is refined, and the engravability and cold hobbing property are improved; (B) regulating the amount of V to 0.10% or less, the quenchability is improved, the formation of striped carbides can be prevented, and the engravability is improved; and (C) Si has the effect of imparting temper softening resistance at around 200° C.

The high toughness hot-working tool steel described in Patent Literature 1 has low thermal conductivity due to a large amount of Si. In addition, the amount of Mo+W/2 is small, and thus the softening resistance thereof is also low.

The hot-working tool steel described in Patent Literature 2 has an excessive amount of Cr, so that a Cr carbide precipitates before a carbide containing Mo and/or W (hereinafter, also referred to as "(Mo, W) carbide") precipitates. As a result, the amount of Mo+W/2 is appropriate, but the amount of (Mo, W) carbide precipitated is reduced, and high softening resistance cannot be obtained.

Similar to the hot-working tool steel described in Patent Literature 2, the warm-hot-working nitrided mold described in Patent Literature 3 also has an excessive amount of Cr, so that high softening resistance cannot be obtained.

Furthermore, the air-quenching cold tool steel described in Patent Literature 4 has a small amount of Mo+W/2, and thus has low temper softening resistance in a high temperature range higher than 200° C.

Patent Literature 1: JP-A-2016-166379
Patent Literature 2: JP-A-2008-095190
Patent Literature 3: JP-A-2001-073087
Patent Literature 4: JP-A-H06-256895

SUMMARY OF INVENTION

An object of the present invention is to provide a steel for mold, having high softening resistance.

Another object of the present invention is to provide a steel for mold, having high initial hardness and/or high thermal conductivity.

Yet another object of the present invention is to provide a mold using such a steel for mold.

In order to solve the above-described problems, a steel for mold according to the present invention has the following configurations:

(1) the steel for mold contains:

0.28 mass %≤C≤0.65 mass %, 0.01 mass %≤Si≤0.30 mass %, 1.5 mass %≤Mn≤3.0 mass %, 0.5 mass %≤Cr≤1.4 mass %, 1.9 mass %≤Mo+W/2≤4.0 mass %, 0.2 mass %≤V≤1.0 mass %, and 0.01≤N≤0.10 mass %, with the balance being Fe and inevitable impurities, (2) for the steel for mold in a state after quenching and tempering, a (Mo, W) carbide having a diameter of 0.2 µm or less is in an amount of 1.2 mass % or more, a ratio (mass ratio) of the amount of the (Mo, W) carbide to an amount of a Cr carbide is 11 or more, and a hardness change is 15 HRC or less.

It is preferable that the steel for mold has, in the state after quenching and tempering:

an initial hardness of 52 HRC or more, and/or a thermal conductivity at room temperature of 30 W/(m·K) or more.

A mold according to the present invention has the following configurations:

(1) the mold includes the steel for mold according to the present invention, (2) for the mold a (Mo, W) carbide having a diameter of 0.2 µm or less is in an amount of 1.2 mass % or more, a ratio (mass ratio) of the amount of the (Mo, W) carbide to an amount of a Cr carbide is 11 or more, and a hardness change is 15 HRC or less.

It is preferable that the mold has:

an initial hardness of 52 HRC or more, and/or a thermal conductivity at room temperature of 30 W/(m·K) or more.

Since the amount of Cr is relatively reduced and the amount of Mo+W/2 is relatively increased, a large amount of a fine (Mo, W) carbide is precipitated, and the precipitation of the Cr carbide is prevented. As a result, the softening resistance is improved.

DESCRIPTION OF EMBODIMENTS

Hereinafter, an embodiment of the present invention will be described in detail.

[1. Steel for Mold]

[1.1. Main Constituent Elements]

The steel for mold according to the present invention contains the following elements with the balance being Fe and inevitable impurities, and may be an ingot material or powder for additive manufacturing. The kinds of the added elements, component ranges thereof, and the reasons for limitation are as follows.

$$0.28 \text{ mass \%} \leq C \leq 0.65 \text{ mass \%}: \quad (1)$$

C is an element required to obtain high hardness. In the case where the amount of C is small, the amount of solid solution C and the amount of carbides are small, and a high hardness such as 52 HRC or more cannot be obtained. Therefore, the amount of C is required to be 0.28 mass % or more. The amount of C in the ingot material is preferably 0.50 mass % or more, and more preferably 0.55 mass % or more.

On the other hand, in the case where the amount of C is excessive, the amount of coarse carbides increases and the amount of retained austenite also increases, so that a high hardness such as 52 HRC or more cannot be obtained. Furthermore, in the case where the amount of C is excessive, when a mold is produced by using an additive manufacturing method, the mold is likely to be cracked during the additive manufacturing. Therefore, the amount of C is required to be 0.65 mass % or less. The amount of C in the powder for additive manufacturing is preferably 0.40 mass % or less, and more preferably 0.35 mass % or less.

$$0.01 \text{ mass \%} \leq Si \leq 0.30 \text{ mass \%}: \quad (2)$$

In the case where the amount of Si is excessive, the thermal conductivity is lowered. When the thermal conductivity is lowered, the surface temperature of the mold rises excessively when processing a high-temperature work material, and seizure is likely to occur. Therefore, the amount of Si is required to be 0.30 mass % or less. The amount of Si is preferably 0.15 mass % or less, and more preferably 0.10 mass % or less.

$$1.5 \text{ mass \%} \leq Mn \leq 3.0 \text{ mass \%}: \quad (3)$$

In the case where the amount of Mn is too small, the quenchability is lowered. Therefore, the amount of Mn is required to be 1.5 mass % or more. The amount of Mn is preferably 1.55 mass % or more.

On the other hand, in the case where the amount of Mn is excessive, the thermal conductivity is lowered. Therefore, the amount of Mn is required to be 3.0 mass % or less. The amount of Mn is preferably 2.0 mass % or less, and more preferably 1.8 mass % or less.

$$0.5 \text{ mass \%} \leq Cr \leq 1.4 \text{ mass \%}: \quad (4)$$

In the case where the amount of Cr is too small, the quenchability is lowered. Therefore, the amount of Cr is required to be 0.5 mass % or more. The amount of Cr is preferably 0.6 mass % or more, and more preferably 0.7 mass % or more.

On the other hand, in the case where the amount of Cr is excessive, a large amount of a Cr carbide is generated during tempering, and the amount of a (Mo, W) carbide decreases. As a result, the softening resistance is lowered. In addition, in the case where the amount of Cr is excessive, the thermal conductivity is lowered.

Furthermore, when a high-temperature work material is processed by using a mold containing excess Cr, a high-hardness Cr oxide is generated on the surface of the mold, and the oxide is entrained and the mold is thus likely to wear. Furthermore, the Cr oxide is non-uniformly formed on the surface of the mold, and the seizure of the work material (e.g., a plated steel plate) is likely to occur.

Therefore, the amount of Cr is required to be 1.4 mass % or less. The amount of Cr is preferably 1.3 mass % or less, and more preferably 1.2 mass % or less.

$$1.9 \text{ mass \%} \leq Mo+W/2 \leq 4.0 \text{ mass \%}: \tag{5}$$

Mo+W/2 contributes to high hardness and high softening resistance. In the case where the amount of Mo+W/2 is too small, a high hardness such as 52 HRC or more cannot be obtained due to the decrease in the amount of secondary precipitated carbides. In addition, the amount of the (Mo, W) carbide also decreases, and the softening resistance is lowered. Therefore, the amount of Mo+W/2 is required to be 1.9 mass % or more.

On the other hand, in the case where the amount of Mo+W/2 is excessive, the amount of the coarse (Mo, W) carbide increases and the amount of solid solution C decreases. As a result, a high hardness such as 52 HRC or more and high softening resistance cannot be obtained. In addition, since the amount of expensive Mo and/or W increases, the melting cost also increases. Therefore, the amount of Mo+W/2 is required to be 4.0 mass % or less. The amount of Mo+W/2 is preferably 3.0 mass % or less, and more preferably 2.7 mass % or less.

$$0.2 \text{ mass \%} \leq V \leq 1.0 \text{ mass \%}: \tag{6}$$

V contributes to the prevention of coarsening of crystal grains during quenching. In the case where the amount of V is small, the number of pinning particles (VC particles) is small, and the crystal grains are coarsened during quenching. As a result, the toughness is low. Therefore, the amount of V is required to be 0.2 mass % or more. The amount of V is preferably 0.3 mass % or more, and more preferably 0.4 mass % or more.

On the other hand, in the case where the amount of V is excessive, the amount of coarse carbides that do not improve the hardness increases. Furthermore, since the amount of solid solution C and the amount of the (Mo, W) carbide are reduced, the hardness is lowered and high softening resistance cannot be obtained. Therefore, the amount of V is required to be 1.0 mass % or less. The amount of V is preferably 0.85 mass % or less, and more preferably 0.8 mass % or less.

$$0.01 \text{ mass \%} \leq N \leq 0.10 \text{ mass \%}: \tag{7}$$

In the case where the amount of N is small, the amount of fine nitrides serving as cores of carbides decreases, and the predetermined amount of the (Mo, W) carbide cannot be obtained. Therefore, the amount of N is required to be 0.01 mass % or more.

On the other hand, in the case where the amount of N is excessive, a large amount of coarse nitrides is generated and a fine (Mo, W) carbide cannot be obtained. Therefore, the amount of N is required to be 0.10 mass % or less. The amount of N is preferably 0.05 mass % or less.

(8) Inevitable Impurities:

In the present invention, when the following elements are less than the following upper limit values, they are treated as inevitable impurities.

(a) Al≤0.005 mass %,
(b) P≤0.05 mass %,
(c) S≤0.01 mass %,
(d) Cu≤0.30 mass %,
(e) Ni≤0.30 mass %,
(f) O≤0.01 mass %,
(g) Co≤0.10 mass %,
(h) Nb≤0.10 mass %,
(i) Ta≤0.10 mass %,
(j) Ti≤0.10 mass %,
(k) Zr≤0.01 mass %,
(l) B≤0.001 mass %,
(m) Ca≤0.001 mass %,
(n) Se≤0.03 mass %,
(o) Te≤0.01 mass %,
(p) Bi≤0.01 mass %,
(q) Pb≤0.03 mass %,
(r) Mg≤0.02 mass %, and
(s) REM≤0.01 mass %.

[1.2. Auxiliary Constituent Elements]

The steel for mold according to the present invention may further contain one or more of the following elements in addition to the main constituent elements. The kinds of the added elements, component ranges thereof, and the reasons for limitation are as follows.

$$0.005 \text{ mass \%} \leq Al \leq 1.5 \text{ mass \%}: \tag{9}$$

$$0.01 \text{ mass \%} \leq Ti \leq 0.5 \text{ mass \%}: \tag{10}$$

$$0.01 \text{ mass \%} \leq Nb \leq 0.5 \text{ mass \%}: \tag{11}$$

$$0.01 \text{ mass \%} \leq Zr \leq 0.5 \text{ mass \%}: \tag{12}$$

$$0.01 \text{ mass \%} \leq Ta \leq 0.5 \text{ mass \%}: \tag{13}$$

All of Al, Ti, Nb, Zr, and Ta contribute to the prevention of coarsening of crystal grains during quenching. All of these elements form precipitates that function as pinning particles. As a result, the crystal grains become fine grains and the toughness is improved. In order to obtain such effects, the content of each of these elements is preferably the above-described lower limit value or more.

On the other hand, in the case where the content of each of these elements is excessive, the precipitates aggregate and do not function as pinning particles. Therefore, the content of each of these elements is preferably the above-described upper limit value or less.

The steel for mold may contain any one of these elements, or may contain two or more of these elements.

$$0.01 \text{ mass \%} \leq Co \leq 1.0 \text{ mass \%}: \tag{14}$$

Co contributes to the improvement of high temperature strength. In order to obtain such an effect, the amount of Co is preferably 0.01 mass % or more. The amount of Co is preferably 0.3 mass % or more, and more preferably 0.5 mass % or more.

On the other hand, in the case where the amount of Co is excessive, the melting cost increases and the thermal conductivity is lowered. Therefore, the amount of Co is preferably 1.0 mass % or less. The amount of Co is more preferably 0.9 mass % or less.

$$0.30 \text{ mass \%} \leq Ni \leq 1.0 \text{ mass \%}: \tag{15}$$

$$0.30 \text{ mass \%} \leq Cu \leq 1.0 \text{ mass \%}: \tag{16}$$

Both Cu and Ni delay the formation of pearlite and contribute to the improvement of the quenchability. In order to obtain such effects, each of the amount of Ni and the amount of Cu is preferably 0.30 mass % or more.

On the other hand, in the case where the amount of Ni or Cu is excessive, the melting cost increases and the thermal conductivity is lowered. Furthermore, in the case where the amount of Ni is excessive, the amount of retained austenite increases and the hardness is lowered. Therefore, each of the amount of Ni and the amount of Cu is preferably 1.0 mass % or less.

The steel for mold may contain either Ni or Cu, or may contain both.

$$0.01 \text{ mass \%} \leq S \leq 0.15 \text{ mass \%}: \quad (17)$$

$$0.001 \text{ mass \%} \leq Ca \leq 0.15 \text{ mass \%}: \quad (18)$$

$$0.03 \text{ mass \%} \leq Se \leq 0.35 \text{ mass \%}: \quad (19)$$

$$0.01 \text{ mass \%} \leq Te \leq 0.35 \text{ mass \%}: \quad (20)$$

$$0.01 \text{ mass \%} \leq Bi \leq 0.50 \text{ mass \%}: \quad (21)$$

$$0.03 \text{ mass \%} \leq Pb \leq 0.50 \text{ mass \%}: \quad (22)$$

All of S, Ca, Se, Te, Bi, and Pb contribute to the improvement of the machinability. In order to obtain such an effect, the content of each of these elements is preferably the above-described lower limit value or more.

On the other hand, in the case where the content of each of these elements is excessive, inclusions are likely to be formed. The inclusions serve as the starting point of fracture and cause a decrease in toughness. Therefore, the content of each of these elements is preferably the above-described upper limit value or less.

The steel for mold may contain any one of these elements, or may contain two or more of these elements.

[1.3. Properties]
[1.3.1. Heat Treatment Conditions]

Since the components of the steel for mold according to the present invention are optimized, the steel for mold exhibits high properties in the state after quenching and tempering.

Here, the expression "state after quenching and tempering" refers to a state after (a) soaking at 1,030° C.±20° C. for 45 min±15 min and then quenching at a cooling rate of 9° C./min to 30° C./min, and (b) performing twice tempering of soaking at 540° C. to 600° C. for 1 hour and then air-cooling.

In addition to optimizing the components, when the quenching and tempering are performed under the conditions described above, the amount of the Cr carbide and the amount of the (Mo, W) carbide can be controlled.

Since crystallized carbides may be generated after melt casting in some cases, it is preferable to perform a soaking treatment at 1,200° C. or higher after melt casting and before hot forging. In particular, in the case where the amount of C is in the range of 0.55 mass % to 0.65 mass %, it is preferable to perform the soaking treatment. When the soaking treatment is performed, coarse crystallized carbides can be reduced, a large amount of the fine (Mo, W) carbide after quenching and tempering can be precipitated, and the softening resistance is improved.

In the case where the quenching temperature is too low, the amount of solid solution elements is small, and the hardness and the softening resistance are lowered. Therefore, the quenching temperature is preferably 1,010° C. or higher.

On the other hand, in the case where the quenching temperature is too high, the amount of solid solution elements is too large, the retained austenite increases, and the hardness is lowered. In addition, the crystal grains become coarse. Therefore, the quenching temperature is preferably 1,050° C. or lower.

The holding time at the quenching temperature is preferably 45 min±15 min from the viewpoint of making the quenching temperature uniform.

The cooling rate is preferably 9° C./min or more in order to make the structure full martensite, and 30° C./min or less in order to prevent quenching cracks.

In the case where the tempering temperature is too low, the amount of the Cr carbide increases and the amount of the (Mo, W) carbide decreases. Therefore, the tempering temperature is preferably 540° C. or higher.

On the other hand, in the case where the tempering temperature is too high, the carbides become coarse and the effect of improving the initial hardness and the softening resistance is reduced. Therefore, the tempering temperature is preferably 600° C. or lower.

From the viewpoint of tempering parameters including temperature and time, the holding time at the tempering temperature is preferably about 1 h such that the maximum hardness can be obtained.

The number of times of tempering is preferably twice because it is necessary to temper the structure transforming from retained austenite to martensite during the tempering for the first time.

[1.3.2. Amount of (Mo, W) Carbide]

In the present invention, the expression "amount of the (Mo, W) carbide" refers to the mass ratio of a carbide containing Mo and/or W and being fine (having a diameter of 0.2 μm or less) in the steel. The term "diameter" refers to the equivalent circle diameter.

Fine (Mo, W) carbides contribute to the improvement of the initial hardness and the softening resistance. In general, the larger the amount of the (Mo, W) carbide, the higher the initial hardness and/or the higher the softening resistance. In order to obtain such effects, the amount of the (Mo, W) carbide is required to be 1.2 mass % or more in the state after quenching and tempering.

[1.3.3. Ratio of Amount of (Mo, W) Carbide to Amount of Cr Carbide]

The expression "ratio of the amount of the (Mo, W) carbide to the amount of the Cr carbide (hereinafter, also referred to as "carbide ratio")" refers to the ratio of the mass of the (Mo, W) carbide having a diameter of 0.2 μm or less to the mass of the Cr carbide having a diameter of 0.2 μm or less (amount of fine (Mo, W) carbide/amount of fine Cr carbide).

Both fine (Mo, W) carbides and fine Cr carbides contribute to the initial hardness. However, in the case where the amount of the Cr carbide is relatively excessive, C is taken up by the Cr carbide, so that the amount of the (Mo, W) carbide decreases and high softening resistance cannot be obtained. Therefore, the carbide ratio is required to be 11 or more in the state after quenching and tempering.

[1.3.4. Initial Hardness]

The "initial hardness" refers to Rockwell hardness (C scale) measured at room temperature immediately after quenching and tempering.

Since the steel for mold according to the present invention has a relatively small amount of Cr and a relatively large amount of Mo+W/2, when quenching and tempering are performed under appropriate conditions thereto, a large amount of fine (Mo, W) carbides are precipitated in the matrix. As a result, a high initial hardness is obtained. When the production conditions are optimized, the initial hardness can be 52 HRC or more in the state after quenching and tempering. When the production conditions are further optimized, the initial hardness can be 53 HRC or more, or 54 HRC or more.

[1.3.5. Hardness Change (Softening Resistance)]

The "hardness change" refers to an absolute value represented by the following equation (1). The hardness change indicates the magnitude of the softening resistance, and the closer the hardness change is to zero, the higher the softening resistance.

$$\text{Hardness change} = |H_b - H_a| \quad (1)$$

in which $H_a$ represents the Rockwell hardness (C scale) measured at room temperature after quenching and tempering under the above-described conditions and further holding at 600° C. for 130 hours, and $H_b$ is the Rockwell hardness (C scale) measured at room temperature immediately after quenching and tempering under the above-described conditions.

Since the steel for mold according to the present invention has a relatively small amount of Cr and a relatively large amount of Mo+W/2, when quenching and tempering are performed under appropriate conditions thereto, a large amount of fine (Mo, W) carbides are precipitated in the matrix. The fine (Mo, W) carbides not only improve the initial hardness, but also contribute to the improvement of the softening resistance. When the production conditions are optimized, the hardness change can be 15 HRC or less. When the production conditions are further optimized, the hardness change can be 12 HRC or less, or 10 HRC or less.

[1.3.6. Thermal Conductivity]

In general, Si is added for the purpose as a deoxidant or for the purpose of improving the hardness, improving the machinability, improving the oxidation resistance, improving the temper softening resistance at around 200° C., and the like. However, in the case where the Si content is excessive, the thermal conductivity is remarkably lowered.

The steel for mold according to the present invention has a high thermal conductivity since the amount of Si is minimized Specifically, when the production conditions are optimized, the thermal conductivity at room temperature can be 30 W/(m·K) or more. When the production conditions are further optimized, the thermal conductivity at room temperature can be 35 W/(m·K) or more.

[2. Mold]

The mold according to the present invention has the following configurations:

(1) the mold includes the steel for mold according to the present invention, (2) for the mold a (Mo, W) carbide having a diameter of 0.2 μm or less is in an amount of 1.2 mass % or more, a ratio (mass ratio) of the amount of the (Mo, W) carbide to an amount of a Cr carbide is 11 or more, and a hardness change is 15 HRC or less.

It is preferable that the mold has, an initial hardness of 52 HRC or more, and/or a thermal conductivity at room temperature of 30 W/(m·K) or more.

[2.1. Steel for Mold]

The mold according to the present invention is made of the steel for mold according to the present invention. Since the details of the steel for mold are as described above, the description thereof will be omitted here.

[2.2. Properties]

The mold according to the present invention is obtained by quenching and tempering the steel for mold according to the present invention under predetermined conditions. Therefore, in the state after quenching and tempering, the mold has:

(a) a content of the (Mo, W) carbide having a diameter of 0.2 μm or less being 1.2 mass % or more, (b) a ratio (mass ratio) of the amount of the (Mo, W) carbide to the amount of the Cr carbide being 11 or more, and (c) a hardness change of 15 HRC or less.

It is preferable that the mold further has:

(d) an initial hardness of 52 HRC or more and/or (e) a thermal conductivity of 30 W/(m·K) or more at room temperature.

Since the details of the properties the mold are as described above, the description thereof will be omitted here.

[2.3. Applications]

The mold according to the present invention is particularly suitable as a mold for performing hot working. Examples of the applications of the mold according to the present invention include a die-casting mold, a hot stamping mold, a tailored die quenching mold, and the like.

[3. Method for Producing Mold]

The mold according to the present invention can be produced by various methods.

For example, the mold according to the present invention can be produced through:

(a) melt-casting a raw material blended to have predetermined components to form an ingot, (b) performing a soaking treatment for dissolving a crystallized carbide as a solid solution, (c) hot-forging the ingot, (d) subjecting the hot forged product to a heat treatment for softening (e.g., spheroidizing annealing), (e) cutting and crudely processing the softened steel, (f) quenching and tempering the crudely-processed product under predetermined conditions, and (g) subjecting the heat-treated product to a finishing processing.

The method and conditions of each step are not particularly limited, and the optimum method and conditions can be selected according to the purpose.

Alternatively, the mold according to the present invention can be produced through:

(a) producing, by using an atomization method, a powder composed of the steel for mold according to the present invention, (b) additive manufacturing the obtained powder, and (c) tempering the manufactured product.

In addition, if necessary, the finishing processing is performed after the tempering.

In the case of producing the mold by using the additive manufacturing method, when the conditions during the additive manufacturing are optimized, the quenching can be performed at the same time as the additive manufacturing.

Other points regarding the method and conditions of each step are not particularly limited, and the optimum method and conditions can be selected according to the purpose.

[4. Effects]

Since the amounts of added components of the steel for mold according to the present invention are optimized, when appropriate heat treatments (soaking treatment and quenching and tempering treatment) are performed thereto, the amount of the Cr carbide and the amount of the (Mo, W) carbide can be controlled in appropriate ranges. As a result, a mold having a hardness change of 15 HRC or less and having excellent wear resistance can be obtained. In addition, when the components and heat treatment conditions are optimized, the initial hardness can be 52 HRC or more and/or the thermal conductivity can be 30 W/(m·K) or more, so that the rise in surface temperature of the mold is prevented even when a hot working is performed. As a result, the softening of the mold is further prevented.

In addition, since the amount of Cr is relatively small, the formation of the Cr oxide having high hardness can be prevented even in the case where the mold according to the present invention is applied to hot stamping or the like. As a result, the wear of the mold due to the Cr oxide having high hardness, or the seizure of the oxide film on the surface of the work material onto the surface of the mold can be prevented. In addition, since the mold has high thermal conductivity, the effect of shortening the cycle time is obtained.

Furthermore, in the case where other component elements such as Al, Co, Cu and Ni are added, the softening resistance, the high temperature strength, the high temperature quenchability, and the machinability can be further improved.

For example, in the case where the initial hardness of the hot stamping mold is low, the mold is worn to be damaged during the hot stamping. Furthermore, since the temperature of the mold rises during molding, in the case where the softening resistance is low, the hardness is low and the wear is exacerbated.

In particular, in the case of a tailored die quenching mold, the mold is partially heated to slow down the cooling rate for a portion in contact with the heating region to a cooling rate that does not cause martensitic transformation, thereby preventing the quenching of this portion. Therefore, since a part of the mold is exposed to a high temperature for a long time, the mold is required to have high softening resistance. In addition, in the case where the thermal conductivity of the mold is low, the surface temperature of the mold is increased, which leads to exacerbation of softening and wear. In the case where the thermal conductivity is low, the speed at which the heat of the heated steel plate is taken away by the mold is slow, and it takes time to quench the steel plate. Furthermore, after the steel plate is molded and taken out, the time required for cooling the mold is longer. When the next steel plate is to be molded in the state where the mold is not sufficiently cooled, the steel plate is not sufficiently cooled and the quenching may be insufficient.

In contrast, the steel for mold according to the present invention not only has high initial hardness and high softening resistance, but also has high thermal conductivity when the production conditions are optimized. Therefore, when the steel for mold according to the present invention is applied to, for example, a hot stamping mold or a tailored die quenching mold, the molding time and the time required for cooling the mold can be shortened, and the cycle time can be shortened.

EXAMPLES

Examples 1 to 26 and Comparative Examples 1 to 13

[1. Preparation of Sample]

1.1. Examples 1 to 21 and Comparative Examples 1 to 13 (Ingot Materials)

Each of steels having chemical compositions shown in Tables 1 and 2 was melted to form ingot. The obtained steel ingot (excluding Comparative Example 13) was subjected to a soaking treatment at 1,240° C. under homogeneous heat conditions for 20 h. Next, the ingot was subjected to hot forging to produce a bar material having a cross section of 55 mm×55 mm square. The bar material was subjected to quenching and tempering.

The quenching was performed by soaking at 1,030° C. for 60 minutes and then radially cooling at a cooling rate of 20° C./min to 30° C./min.

The tempering was performed by repeating twice the treatment of soaking at 540° C. to 600° C. for 1 hour and then air-cooling. As the tempering temperature, the temperature at which the hardness was highest was selected for each sample.

1.2. Examples 22 to 26 (Additive Manufacturing Materials)

Each of powders having chemical compositions shown in Tables 1 and 2 was prepared. The additive manufacturing was performed by using the obtained powder to produce a bar material having a cross section of 55 mm×55 mm square.

Next, the bar material was subjected to tempering. The tempering conditions were the same as those of the ingot material.

TABLE 1

| | | Production | C | Si | Mn | Cr | Mo + 1/2W | V | N | Other elements |
|---|---|---|---|---|---|---|---|---|---|---|
| Example | 1 | Ingot material | 0.61 | 0.08 | 1.55 | 0.69 | 3.29 | 0.34 | 0.019 | — |
| | 2 | | 0.53 | 0.12 | 1.98 | 0.72 | 2.05 | 0.57 | 0.017 | — |
| | 3 | | 0.50 | 0.25 | 1.60 | 1.38 | 3.29 | 0.83 | 0.010 | — |
| | 4 | | 0.50 | 0.11 | 1.79 | 0.68 | 2.24 | 0.78 | 0.011 | — |
| | 5 | | 0.54 | 0.04 | 1.51 | 0.75 | 1.90 | 0.53 | 0.016 | — |
| | 6 | | 0.58 | 0.15 | 1.76 | 0.70 | 2.06 | 0.85 | 0.025 | — |
| | 7 | | 0.62 | 0.27 | 2.26 | 0.66 | 2.98 | 0.52 | 0.024 | — |
| | 8 | | 0.63 | 0.27 | 1.52 | 0.92 | 2.87 | 0.34 | 0.021 | — |
| | 9 | | 0.56 | 0.23 | 1.55 | 1.29 | 1.95 | 0.27 | 0.018 | — |
| | 10 | | 0.52 | 0.20 | 1.77 | 0.84 | 1.58 | 0.66 | 0.016 | — |
| | 11 | | 0.60 | 0.10 | 1.61 | 0.98 | 2.02 | 0.62 | 0.037 | — |
| | 12 | | 0.46 | 0.22 | 1.83 | 0.54 | 1.99 | 0.25 | 0.025 | — |
| | 13 | | 0.56 | 0.29 | 2.43 | 0.76 | 3.38 | 0.37 | 0.017 | — |
| | 14 | | 0.57 | 0.29 | 1.61 | 1.27 | 3.09 | 0.26 | 0.019 | — |
| | 15 | | 0.51 | 0.24 | 2.08 | 0.89 | 3.83 | 0.31 | 0.084 | Al: 1.33 |
| | 16 | | 0.61 | 0.02 | 2.73 | 0.58 | 2.63 | 0.65 | 0.014 | Ti: 0.42 |
| | 17 | | 0.47 | 0.26 | 1.54 | 0.55 | 2.78 | 0.72 | 0.022 | Nb: 0.47 |

TABLE 1-continued

| Production | C | Si | Mn | Cr | Mo + 1/2W | V | N | Other elements |
|---|---|---|---|---|---|---|---|---|
| 18 | 0.65 | 0.09 | 1.58 | 1.05 | 2.87 | 0.33 | 0.017 | Cu: 0.99 |
| 19 | 0.60 | 0.05 | 2.87 | 1.21 | 2.08 | 0.37 | 0.011 | S: 0.12 |
| 20 | 0.62 | 0.09 | 1.95 | 1.27 | 2.39 | 0.43 | 0.015 | Pb: 0.40 |
| 21 | 0.48 | 0.30 | 2.94 | 0.82 | 2.44 | 0.43 | 0.019 | Nb: 0.21, Co: 0.78, Ca: 0.09 |

TABLE 2

| | Production | | C | Si | Mn | Cr | Mo + 1/2W | V | N | Other elements |
|---|---|---|---|---|---|---|---|---|---|---|
| Example | 22 | Additive | 0.31 | 0.05 | 1.61 | 1.03 | 2.07 | 0.62 | 0.034 | |
| | 23 | manufacturing | 0.28 | 0.14 | 1.86 | 0.61 | 3.93 | 0.30 | 0.015 | Co: 0.86 |
| | 24 | material | 0.34 | 0.17 | 1.95 | 1.39 | 2.10 | 0.98 | 0.019 | Ni: 0.91 |
| | 25 | from powder | 0.39 | 0.13 | 1.89 | 1.11 | 1.96 | 0.35 | 0.030 | Ca: 0.15 |
| | 26 | | 0.40 | 0.09 | 1.64 | 0.57 | 3.40 | 0.91 | 0.042 | Bi: 0.45 |
| Comparative | 1 | Ingot material | 0.23 | 0.13 | 2.35 | 1.30 | 2.24 | 0.53 | 0.018 | — |
| Example | 2 | | 0.88 | 0.25 | 1.85 | 1.24 | 2.31 | 0.85 | 0.028 | — |
| | 3 | | 0.53 | 0.67 | 1.45 | 1.50 | 2.69 | 0.51 | 0.025 | — |
| | 4 | | 0.66 | 0.14 | 3.45 | 1.59 | 2.28 | 0.67 | 0.015 | — |
| | 5 | | 0.63 | 0.19 | 2.05 | 1.99 | 2.81 | 0.86 | 0.017 | — |
| | 6 | | 0.56 | 0.10 | 2.19 | 3.72 | 3.18 | 0.61 | 0.013 | — |
| | 7 | | 0.67 | 0.27 | 1.99 | 5.55 | 3.02 | 0.68 | 0.022 | — |
| | 8 | | 0.51 | 0.20 | 1.26 | 1.08 | 1.56 | 0.61 | 0.017 | — |
| | 9 | | 0.56 | 0.12 | 1.58 | 1.21 | 5.21 | 0.84 | 0.024 | — |
| | 10 | | 0.62 | 0.13 | 1.66 | 1.12 | 2.38 | 1.35 | 0.015 | — |
| | 11 | | 0.58 | 0.04 | 1.70 | 1.33 | 2.03 | 0.76 | 0.002 | — |
| | 12 | | 0.54 | 0.27 | 2.32 | 1.27 | 2.95 | 0.92 | 0.253 | — |
| | 13 | Ingot material (no soaking) | 0.63 | 0.17 | 1.74 | 1.33 | 2.78 | 0.82 | 0.020 | — |

[2. Test Methods]
[2.1. Amounts of Carbides]

A test piece of 10 mm×12 mm×20 mm for measuring the amount of carbide was obtained from the bar material after quenching and tempering. The total amount (mass) of carbides contained in this test piece was measured by electrolytic extraction. In addition, the carbides extracted by electrolysis were automatically analyzed by SEM-EDX (Scanning Electron Microscope-Energy Dispersive X-ray Spectroscopy) method, and the composition and amount (number) of each carbide having a diameter of 0.2 μm or less were measured. Based on the obtained results, the amount of the (Mo, W) carbide and the ratio of the amount of the (Mo, W) carbide to the amount of the Cr carbide were calculated.

The cases having the amount of the (Mo, W) carbide of 1.2 mass % or more and the ratio of the amount of the (Mo, W) carbide to the amount of the Cr carbide of 11 or more were evaluated as "A", and the other cases were evaluated as "B".

[2.2. Initial Hardness]

A test piece for measuring the initial hardness was obtained from the residual material of the bar material after quenching and tempering, and the cross section (cross section perpendicular to the axial direction of the bar material) was flat-polished. The Rockwell hardness (C scale) was measured at room temperature by using the polished surface as a test surface. Tempering was performed in varying temperatures in the range of 540° C. to 600° C., and the cases having a maximum hardness of 52 HRC or more were evaluated as "A", and the other cases were evaluated as "B".

[2.3. Softening Resistance (Hardness Change)]

The residual material of the bar material after quenching and tempering was heated at 600° C. for 130 hours. After cooling to room temperature, a test piece for measuring the hardness was obtained from the residual material, and the cross section (cross section perpendicular to the axial direction of the bar material) was flat-polished. The Rockwell hardness (C scale) was measured at room temperature by using the polished surface as a test surface. The cases having a value obtained by subtracting the hardness after the heat treatment from the initial hardness being 15 HRC or less were evaluated as "A", and the other cases were evaluated as "B".

[2.4. Thermal Conductivity]

A test piece of 10 mm (diameter)×2 mm for measuring the thermal conductivity was obtained from the residual material of the bar material after quenching and tempering. The thermal conductivity at room temperature was measured by using a laser flash method. The cases having a thermal conductivity of 30 W/(m·K) or more at room temperature were evaluated as "A", and the other cases were evaluated as "B".

[2.5. Wear Test]

A punch of 30 mm×60 mm×50 mm was prepared from the residual material of the bar material after quenching and tempering. As the tempering temperature, the temperature at which the initial hardness was highest was selected. A hat-bending of an unplated steel plate heated to 920° C. was performed by using this punch, and wear evaluation for the punch was performed.

Figure 1:
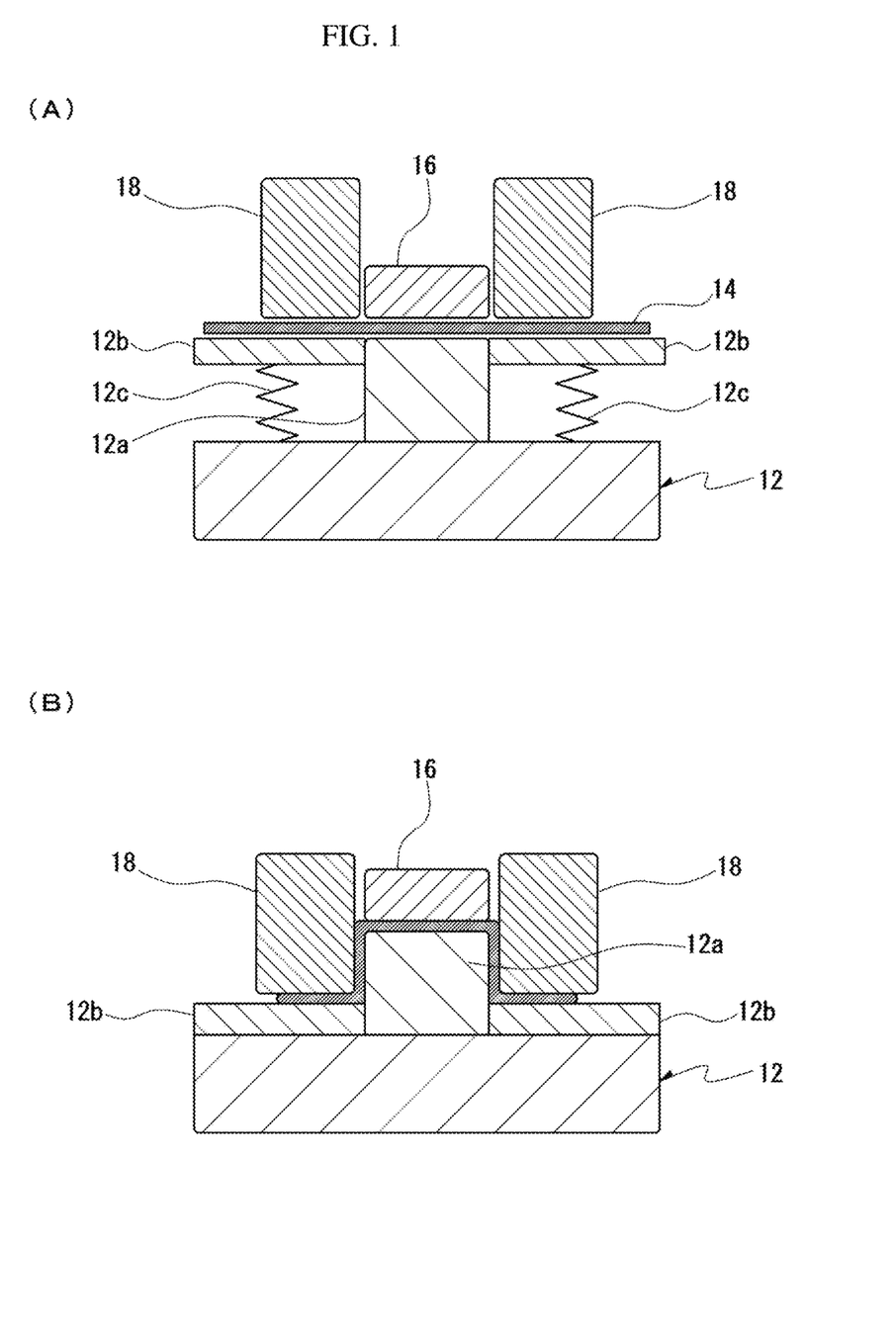
FIG. 1 is a schematic diagram of hat-bending.

FIG. 1 shows a schematic diagram of the hat-bending. First, a steel plate 14 was placed on a die 12 including a protrusion 12a, movable portions 12b and 12b disposed on left and right sides of the protrusion 12a, and springs 12c and 12c supporting the movable portions 12b and 12b ((A) of FIG. 1). Next, a plate 16 disposed above the protrusion 12a and punches 18 and 18 disposed on left and right sides of the plate 16 were lowered to bend four points of the steel plate 14 ((B) of FIG. 1). The hat-bending was an accelerated test, and the clearance was −15%.

Figure 2:
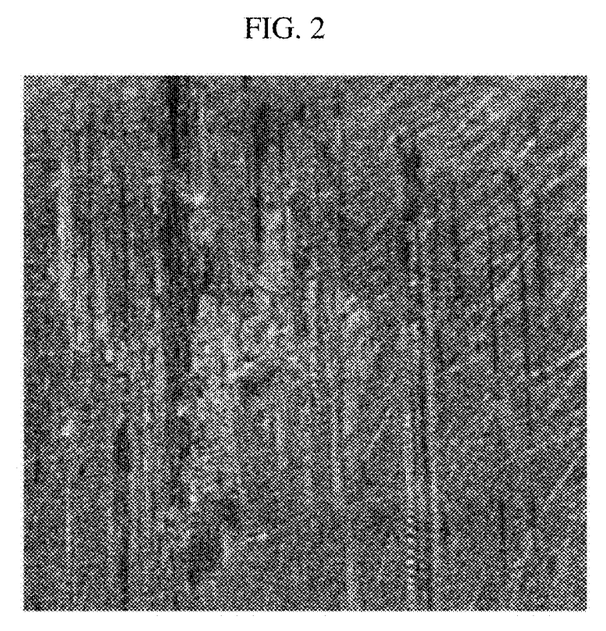
FIG. 2 is an external photograph of the surface of a punch worn due to the hat-bending.

FIG. 2 shows an external photograph of the surface of the punch worn due to the hat-bending. The hat-bending was performed under the above-described conditions, and the cases where such wear as shown in FIG. 2 occurred within 90 shots were evaluated as "B", and the other cases were evaluated as "A".

[2.6. Seizure Test]

A punch was prepared in the same manner as in the wear test. The hat-bending of an Al-plated steel plate heated to 920° C. was performed by using this punch. The clearance was −30%.

Figure 3:
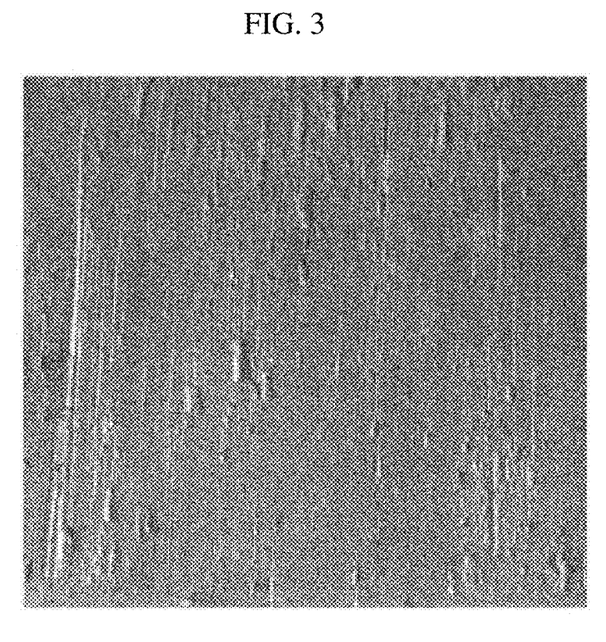
FIG. 3 is an external photograph of the surface of a punch seized due to the hat-bending.

FIG. 3 shows an external photograph of the surface of the punch seized due to the hat-bending. The hat-bending was performed under the above-described conditions, and the cases where such seizure as shown in FIG. 3 occurred within 90 shots were evaluated as "B", and the other cases were evaluated as "A".

[3. Results]

The results are shown in Tables 3 to 6. The followings can be seen from Tables 3 to 6.

(1) In Comparative Example 1, the initial hardness is low, the hardness change is large, and the wear resistance is low. It is considered that this is because the amount of C is low and the amount of fine carbides is small.

(2) In Comparative Example 2, the initial hardness is low, the hardness change is large, and the wear resistance is low. It is considered that this is because the amount of C is excessive and the amount of coarse carbides is large.

(3) In Comparative Example 3, the hardness change is large, the thermal conductivity is low, the wear resistance is low, and the seizure resistance is low. It is considered that this is because the thermal conductivity is low since the amount of Si is high and because the amount of the fine (Mo, W) carbide is small since the amount of Cr is high.

(4) In Comparative Example 4, the hardness change is large, the thermal conductivity is low, the wear resistance is low, and the seizure resistance is low. It is considered that this is because the amount of the fine (Mo, W) carbide is small since the amounts of C and Cr are high, and because the amount of Mn is excessive.

(5) In Comparative Example 5, the hardness change is large, the thermal conductivity is low, the wear resistance is low, and the seizure resistance is low. It is considered that this is because the amount of the fine (Mo, W) carbide is small since the amount of Cr is high.

(6) In Comparative Example 6, the hardness change is large, the thermal conductivity is low, the wear resistance is low, and the seizure resistance is low. It is considered that this is because the amount of Cr is further excessive as compared with Comparative Example 5.

(7) In Comparative Example 7, the hardness change is large, the thermal conductivity is low, the wear resistance is low, and the seizure resistance is low. It is considered that this is because the amount of Cr is further excessive as compared with Comparative Example 5.

(8) In Comparative Example 8, the initial hardness is low, the hardness change is large, and the wear resistance is low. It is considered that this is because the amount of Mo+W/2 is small.

(9) In Comparative Example 9, the initial hardness is low, the hardness change is large, the thermal conductivity is low, the wear resistance is low, and the seizure resistance is low. It is considered that this is because the amount of Mo+W/2 is excessive and the carbide is coarse.

(10) In Comparative Example 10, the initial hardness is low, the hardness change is large, and the wear resistance is low. It is considered that this is because the amount of V is excessive, and because the amount of solid solution C and the amount of the fine (Mo, W) carbide are small.

(11) In Comparative Example 11, the hardness change is large, and the wear resistance is low. It is considered that this is because the amount of N is small.

(12) In Comparative Example 12, the hardness change is large, and the wear resistance is low. It is considered that this is because the amount of N is excessive.

(13) In Comparative Example 13, the initial hardness is low, the hardness change is large, and the wear resistance is low. It is considered that this is because coarse crystallized carbide remains since the soaking treatment is not performed, and the amount of solid solution C and the amount of the fine (Mo, W) carbide are small.

(14) In all Examples 1 to 26, the initial hardness is 52 HRC or more, the hardness change is 15 HRC or less, and the thermal conductivity at room temperature is 30 W/(m·K) or more. In addition, they are all excellent in the wear resistance and the seizure resistance. Therefore, when the alloys of the Examples are applied to, for example, a hot stamping mold, the wear resistance can be improved.

TABLE 3

| | | Amount of (Mo, W) carbide (%) | Amount of (Mo, W) carbide/ amount of Cr carbide | Evaluation | Initial hardness (HRC) | Evaluation |
|---|---|---|---|---|---|---|
| Example | 1 | 3.0 | 26.3 | A | 55.2 | A |
| | 2 | 1.6 | 18.5 | A | 53.4 | A |
| | 3 | 1.6 | 14.4 | A | 52.7 | A |
| | 4 | 1.7 | 20.4 | A | 52.7 | A |
| | 5 | 1.5 | 17.2 | A | 53.5 | A |
| | 6 | 1.7 | 18.9 | A | 54.4 | A |
| | 7 | 2.8 | 25.3 | A | 55.1 | A |
| | 8 | 2.2 | 19.6 | A | 55.3 | A |
| | 9 | 1.2 | 11.6 | A | 54.0 | A |
| | 10 | 1.3 | 14.5 | A | 53.1 | A |
| | 11 | 1.5 | 15.3 | A | 54.8 | A |
| | 12 | 1.7 | 22.0 | A | 52.1 | A |
| | 13 | 2.8 | 25.0 | A | 53.9 | A |
| | 14 | 1.7 | 14.9 | A | 54.1 | A |
| | 15 | 2.8 | 24.4 | A | 52.9 | A |
| | 16 | 2.5 | 25.2 | A | 55.0 | A |
| | 17 | 2.4 | 27.4 | A | 52.1 | A |
| | 18 | 2.1 | 18.0 | A | 54.9 | A |
| | 19 | 1.3 | 12.5 | A | 54.8 | A |
| | 20 | 1.6 | 14.6 | A | 54.7 | A |
| | 21 | 1.7 | 19.0 | A | 52.2 | A |

TABLE 4

| | | Amount of (Mo, W) carbide (%) | Amount of (Mo, W) carbide/ amount of Cr carbide | Evaluation | Initial hardness (HRC) | Evaluation |
|---|---|---|---|---|---|---|
| Example | 22 | 1.8 | 15.9 | A | 53.9 | A |
| | 23 | 4.8 | 33.2 | A | 55.3 | A |
| | 24 | 1.4 | 13.1 | A | 55.2 | A |
| | 25 | 1.4 | 14.1 | A | 55.3 | A |
| | 26 | 3.8 | 31.3 | A | 55.5 | A |
| Comparative Example | 1 | 0.7 | 5.1 | B | 51.1 | B |
| | 2 | 1.0 | 10.8 | B | 50.2 | B |
| | 3 | 0.9 | 10.5 | B | 53.4 | A |
| | 4 | 1.1 | 10.6 | B | 55.1 | A |
| | 5 | 0.4 | 5.2 | B | 54.9 | A |
| | 6 | 0.8 | 1.2 | B | 54.0 | A |
| | 7 | 0.9 | 3.6 | B | 54.7 | A |
| | 8 | 0.5 | 9.4 | B | 51.2 | B |
| | 9 | 0.8 | 10.3 | B | 50.9 | B |

TABLE 4-continued

|   | Amount of (Mo, W) carbide (%) | Amount of (Mo, W) carbide/ amount of Cr carbide | Evaluation | Initial hardness (HRC) | Evaluation |
|---|---|---|---|---|---|
| 10 | 0.8 | 8.9 | B | 51.5 | B |
| 11 | 1.0 | 10.1 | B | 53.6 | A |
| 12 | 0.8 | 9.5 | B | 52.9 | A |
| 13 | 0.9 | 9.4 | B | 51.6 | B |

TABLE 5

|  |  | Hardness (HRC) after holding at 600° C. for 130 hours | Hardness change (HRC) | Evaluation | Thermal conductivity (W/(m · K)) | Evaluation | Wear test evaluation | Seizure test evaluation |
|---|---|---|---|---|---|---|---|---|
| Example | 1 | 46.0 | 9.2 | A | 36.8 | A | A | A |
|  | 2 | 43.0 | 10.4 | A | 35.2 | A | A | A |
|  | 3 | 40.7 | 12.0 | A | 32.6 | A | A | A |
|  | 4 | 42.7 | 10.0 | A | 36.9 | A | A | A |
|  | 5 | 42.7 | 10.8 | A | 38.6 | A | A | A |
|  | 6 | 44.2 | 10.3 | A | 35.6 | A | A | A |
|  | 7 | 45.8 | 9.3 | A | 32.0 | A | A | A |
|  | 8 | 45.2 | 10.1 | A | 35.5 | A | A | A |
|  | 9 | 39.4 | 14.6 | A | 33.6 | A | A | A |
|  | 10 | 41.2 | 12.0 | A | 35.6 | A | A | A |
|  | 11 | 43.2 | 11.5 | A | 35.9 | A | A | A |
|  | 12 | 42.4 | 9.7 | A | 36.9 | A | A | A |
|  | 13 | 44.6 | 9.3 | A | 30.6 | A | A | A |
|  | 14 | 42.4 | 11.7 | A | 33.3 | A | A | A |
|  | 15 | 43.5 | 9.4 | A | 31.1 | A | A | A |
|  | 16 | 45.7 | 9.3 | A | 33.1 | A | A | A |
|  | 17 | 43.0 | 9.1 | A | 36.4 | A | A | A |
|  | 18 | 44.4 | 10.5 | A | 34.8 | A | A | A |
|  | 19 | 41.2 | 13.6 | A | 31.0 | A | A | A |
|  | 20 | 42.8 | 11.9 | A | 33.8 | A | A | A |
|  | 21 | 42.0 | 10.3 | A | 30.1 | A | A | A |

TABLE 6

|  |  | Hardness (HRC) after holding at 600° C. for 130 hours | Hardness change (HRC) | Evaluation | Thermal conductivity (W/(m · K)) | Evaluation | Wear test evaluation | Seizure test evaluation |
|---|---|---|---|---|---|---|---|---|
| Example | 22 | 45.4 | 8.5 | A | 35.2 | A | A | A |
|  | 23 | 46.6 | 8.7 | A | 34.7 | A | A | A |
|  | 24 | 42.2 | 13.0 | A | 33.3 | A | A | A |
|  | 25 | 43.1 | 12.2 | A | 36.2 | A | A | A |
|  | 26 | 46.7 | 8.8 | A | 36.5 | A | A | A |
| Comparative Example | 1 | 35.9 | 15.2 | B | 32.4 | A | B | A |
|  | 2 | 34.4 | 15.8 | B | 33.1 | A | B | A |
|  | 3 | 38.2 | 15.2 | B | 28.7 | B | B | B |
|  | 4 | 39.8 | 15.3 | B | 28.1 | B | B | B |
|  | 5 | 38.8 | 16.1 | B | 29.7 | B | B | B |
|  | 6 | 36.6 | 17.4 | B | 26.3 | B | B | B |
|  | 7 | 31.6 | 23.1 | B | 21.8 | B | B | B |
|  | 8 | 35.1 | 16.1 | B | 36.7 | A | B | A |
|  | 9 | 33.9 | 17.0 | B | 28.9 | B | B | B |
|  | 10 | 36.1 | 15.4 | B | 34.7 | A | B | A |
|  | 11 | 37.3 | 16.3 | B | 33.7 | A | B | A |
|  | 12 | 35.6 | 17.3 | B | 30.2 | A | B | A |
|  | 13 | 35.2 | 16.4 | B | 34.8 | A | B | A |

Although the embodiments of the present invention have been described in detail above, the present invention is not limited to the above-described embodiments, and various modifications can be made without departing from the gist of the present invention.

The present application is based on Japanese Patent Application No. 2019-218621 filed on Dec. 3, 2019 and Japanese Patent Application No. 2020-172572 filed on Oct. 13, 2020, the contents thereof being hereby incorporated by reference.

INDUSTRIAL APPLICABILITY

The steel for mold according to the present invention can be used as a material for a die-casting mold, a hot stamping mold, a tailored die quenching mold, and the like.

What is claimed is:

1. A steel for mold, consisting of:
0.28 mass %≤C≤0.65 mass %,
0.01 mass %≤Si≤0.30 mass %,
1.5 mass %≤Mn≤3.0 mass %,
0.5 mass %≤Cr≤1.4 mass %, 1.9 mass % ≤ Mo+W/2 ≤ 4.0 mass %,
0.2 mass % ≤ V ≤ 1.0 mass %, and
0.01 ≤ N ≤ 0.10 mass %,
optionally,
Al ≤ 1.5 mass %,
Ti ≤ 0.5 mass %,
Nb ≤ 0.5 mass %,
Zr ≤ 0.5 mass %,
Ta ≤ 0.5 mass %,
Co ≤ 1.0 mass %,
Ni ≤ 1.0 mass %,
Cu ≤ 1.0 mass %,
S ≤ 0.15 mass %,
Ca ≤ 0.15 mass %,
Se ≤ 0.35 mass %,
Te ≤ 0.35 mass %,
Bi ≤ 0.50 mass %, and
Pb ≤ 0.50 mass %,
with the balance being Fe and inevitable impurities,
wherein, in a state after quenching and tempering, the steel comprises:
a (Mo, W) carbide having a diameter of 0.2 gm or less being in an amount of 1.2 mass % or more,
a ratio (mass ratio) of the amount of the (Mo, W) carbide to an amount of a Cr carbide being 11 or more, and
a hardness change of 15 HRC or less.

2. The steel for mold according to claim 1, satisfying at least one condition selected from the group consisting of:
0.005 mass % ≤ Al ≤ 1.5 mass %,
0.01 mass % ≤ Ti ≤ 0.5 mass %,
0.01 mass % ≤ Nb ≤ 0.5 mass %,
01 mass % ≤ Zr ≤ 0.5 mass %, and
0.01 mass % ≤ Ta ≤ b 0.5 mass %.

3. The steel for mold according to claim satisfying:
0.01 mass % ≤ Co ≤ 1.0 mass %.

4. The steel for mold according to claim 1, satisfying at least one condition selected from the group consisting of:
0.30 mass % ≤ Ni ≤ 1.0 mass %, and
0.30 mass % ≤ Cu ≤ 1.0 mass %.

5. The steel for mold according to claim 1, satisfying at least one condition selected from the group consisting of:
0.01 mass % ≤ S ≤ 0.15 mass %,
0.001 mass % ≤ Ca ≤ 0.15 mass %,
0.03 mass % ≤ Se ≤ 0.35 mass %,
0.01 mass % ≤ Te ≤ 0.35 mass %,
0.01 mass % ≤ Bi ≤ 0.50 mass %, and
0.03 mass % ≤ Pb ≤ 0.50 mass %.

6. The steel for mold according to claim 1, having, in the state after quenching and tempering, an initial hardness of 52 HRC or more.

7. The steel for mold according to claim 1, having, in the state after quenching and tempering, a thermal conductivity at room temperature of 30 W/(m·k) or more.

8. The steel for mold according to claim 1, satisfying:
0.01 mass % ≤ N ≤ 0.05 mass %.

9. The steel for mold according to claim 1, wherein, in a state before the quenching and the tempering, a soaking treatment is performed at 1,200° C. or higher.

10. The steel for mold according to claim 1, wherein, in a state before the quenching and the tempering, a soaking treatment is performed at 1,200° C. or higher after melt casting and before hot forging.

11. The steel for mold according to claim 1, wherein, in a state before the quenching and the tempering, a soaking treatment is performed after melt casting and before hot forging.

12. The steel for mold according to claim 1, satisfying:
2.0 mass % ≤ Mn ≤ 3.0 mass %.

13. The steel for mold according to claim 1, satisfying:
0.55 mass % ≤ C ≤ 0.65 mass %, and
wherein, in a state before the quenching and the tempering, a soaking treatment is performed.

14. The steel for mold according to claim 1, satisfying:
0.55 mass % ≤ C ≤ 0.65 mass %,
wherein, in a state before the quenching and the tempering, a soaking treatment is performed at 1,200° C. or higher.

* * * * *